(12) United States Patent
Ianni

(10) Patent No.: US 7,904,420 B2
(45) Date of Patent: Mar. 8, 2011

(54) IDENTIFICATION AND VERIFICATION OF COMMON CLUSTER FILES RESIDING ON NODES IN A CLUSTER

(75) Inventor: James C. Ianni, Lansdowne, PA (US)

(73) Assignee: Raytheon Company, Waltham, MA (US)

(*) Notice: Subject to any disclaimer, the term of this patent is extended or adjusted under 35 U.S.C. 154(b) by 429 days.

(21) Appl. No.: 12/198,365

(22) Filed: Aug. 26, 2008

(65) Prior Publication Data

US 2010/0057738 A1 Mar. 4, 2010

(51) Int. Cl.
*G06F 7/00* (2006.01)
*G06F 17/00* (2006.01)

(52) U.S. Cl. .......................... 707/620; 709/223
(58) Field of Classification Search ............ None
See application file for complete search history.

(56) References Cited

U.S. PATENT DOCUMENTS

| | | | |
|---|---|---|---|
| 5,832,511 A * | 11/1998 | Beck et al. ...................... 1/1 |
| 6,934,805 B2 | 8/2005 | Hickman et al. ............ 711/114 |
| 7,010,721 B2 | 3/2006 | Vincent ............................. 714/20 |
| 7,065,764 B1 | 6/2006 | Prael et al. ..................... 718/102 |
| 7,103,628 B2 | 9/2006 | Neiman et al. ................ 709/201 |
| 7,162,476 B1 | 1/2007 | Belair et al. ..................... 707/10 |
| 7,174,381 B2 | 2/2007 | Gulko et al. ................... 709/226 |
| 7,243,103 B2 * | 7/2007 | Murphy et al. ........................ 1/1 |
| 7,363,346 B2 | 4/2008 | Groner et al. ................. 709/214 |
| 7,376,693 B2 | 5/2008 | Neiman et al. ................ 709/201 |
| 2004/0093555 A1 * | 5/2004 | Therrien et al. .............. 714/805 |
| 2008/0201403 A1 * | 8/2008 | Andersson et al. ........... 709/202 |
| 2009/0177913 A1 * | 7/2009 | Quinn et al. ...................... 714/4 |

OTHER PUBLICATIONS

Chandramohan et al, "Frangipani: A Scalable Distributed File System", ACM SIGOPS Operating Systems Review, vol. 31, issue 5 Dec. 1997, 14 pages.*

* cited by examiner

*Primary Examiner* — Uyen T. Le
(74) *Attorney, Agent, or Firm* — Baker Botts L.L.P.

(57) ABSTRACT

In accordance with a particular embodiment of the present disclosure, common cluster files residing on nodes in a cluster may be managed by compiling a first list of all files stored on all nodes of the cluster, compiling a second list indicative of unique files and the number of nodes on which each unique file is stored from the first list, determining, from the second list, unique files which are not stored on all nodes, determining, from the second list, which files are required by all nodes, and determining, from the first list and the second list, which files must be added to each node.

20 Claims, 5 Drawing Sheets

IDENTIFICATION AND VERIFICATION OF COMMON CLUSTER FILES RESIDING ON NODES IN A CLUSTER

GOVERNMENT FUNDING

The U.S. Government may have certain rights in this invention as provided for by the terms of Grant No. 04-02811-82200-000 (CLIN 002B) OR GS00T99ALD0209 awarded by ARL-MSRC.

TECHNICAL FIELD

This invention generally relates to file management of local storage on nodes in a supercomputer cluster and, more particularly, identification and verification of common cluster files residing on nodes in a cluster.

BACKGROUND

Computer clusters are groups of linked computers, or nodes, working closely together so as to create a single computational device, or supercomputer. Nodes in a cluster are generally interconnected via a high speed network. A cluster may utilize shared memory and shared storage that is available to all nodes in the cluster. A cluster node may also have local storage available only to that node. Cluster nodes are typically configured similarly or identically and store common cluster files on their local storage devices. Accordingly, one challenge associated with nodes in a cluster is maintaining the uniformity and integrity of the local file systems associated with each node.

SUMMARY OF EXAMPLE EMBODIMENTS

The present disclosure is directed to a system and method for identifying and verifying common cluster files and/or common cluster directories. The teachings of the present disclosure may allow for replacement of missing common cluster files and/or common cluster directories.

In accordance with a particular embodiment of the present disclosure, common cluster files residing on nodes in a cluster may be managed by compiling a first list of all files stored on all nodes of the cluster, compiling a second list indicative of unique files and the number of nodes on which each unique file is stored from the first list, determining, from the second list, unique files which are not stored on all nodes, determining, from the second list, which files are required by all nodes, and determining, from the first list and the second list, which files must be added to each node.

Technical advantages of particular embodiments of the present disclosure include reducing exposure to faulty user intervention, faulty installation scripts, and file system errors. Further technical advantages of particular embodiments include identification of unique nodal files, reduced network traffic, and reduced system overhead.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and for further features and advantages thereof, reference is now made to the following description taken in conjunction with the accompanying drawings, in which.

DETAILED DESCRIPTION

Example embodiments of the invention are best understood by referring to FIGS. 1 through 7 of the drawings, like numerals being used for like and corresponding parts of the various drawings.

In accordance with the teaching of the present disclosure, an example of a software application is provided. The software has the ability to identify and verify common cluster files residing on nodes in a cluster. The software may be used to determine which files are common cluster files, which common cluster files may be missing from a given node, which common cluster files may be corrupt, and which files are necessary but unique to the operation a particular node.

Figure 1:
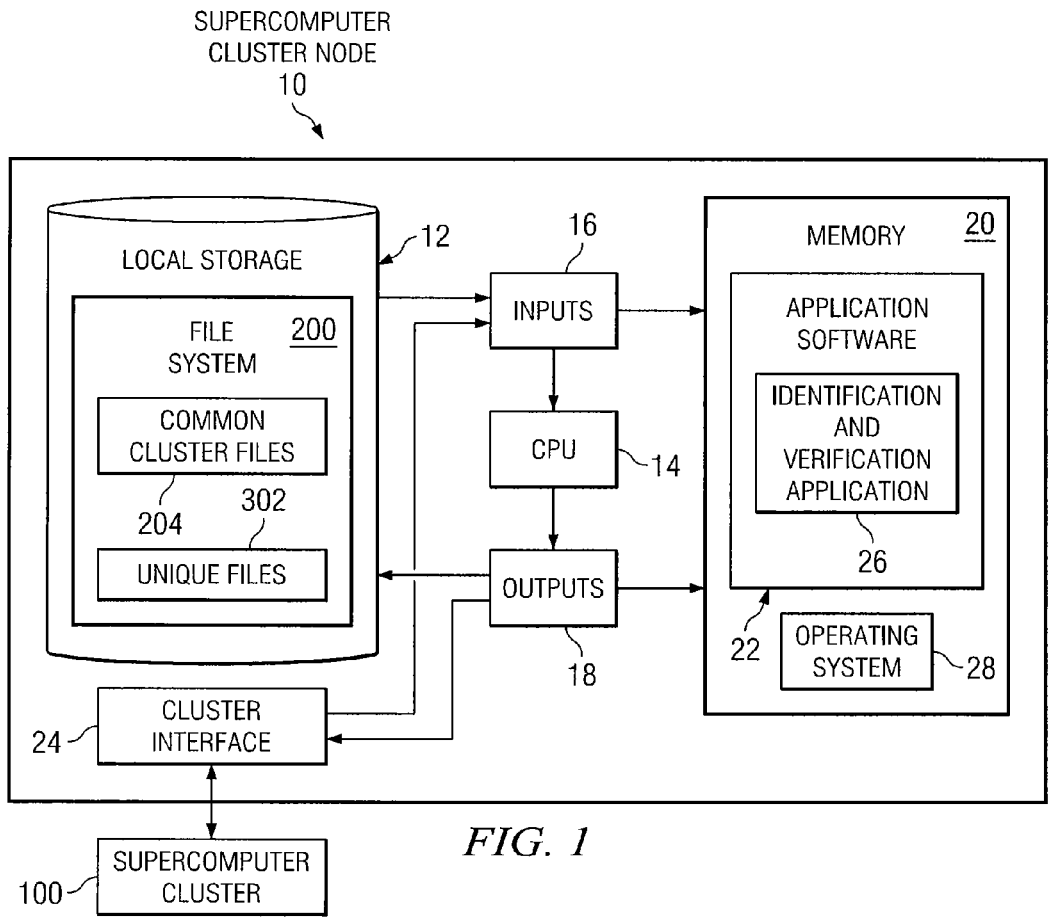
FIG. 1 is a block diagram illustrating an embodiment of a node in a supercomputer cluster.
Figure 2:
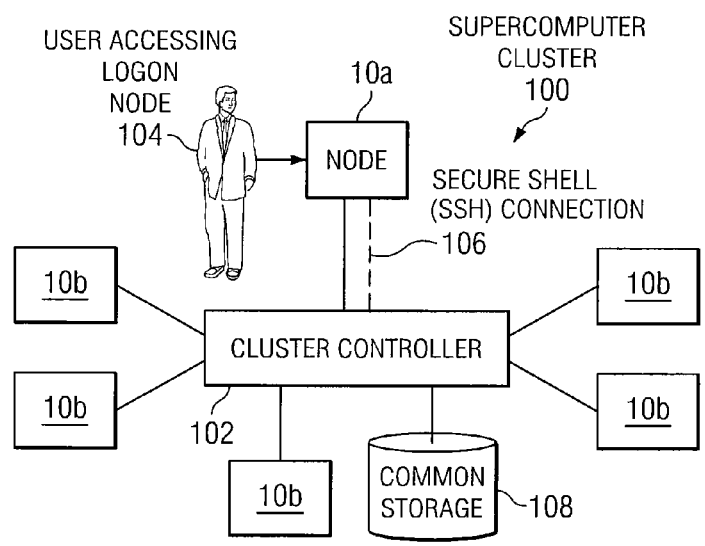
FIG. 2 is a block diagram illustrating an embodiment of a supercomputer cluster.
Figure 3:
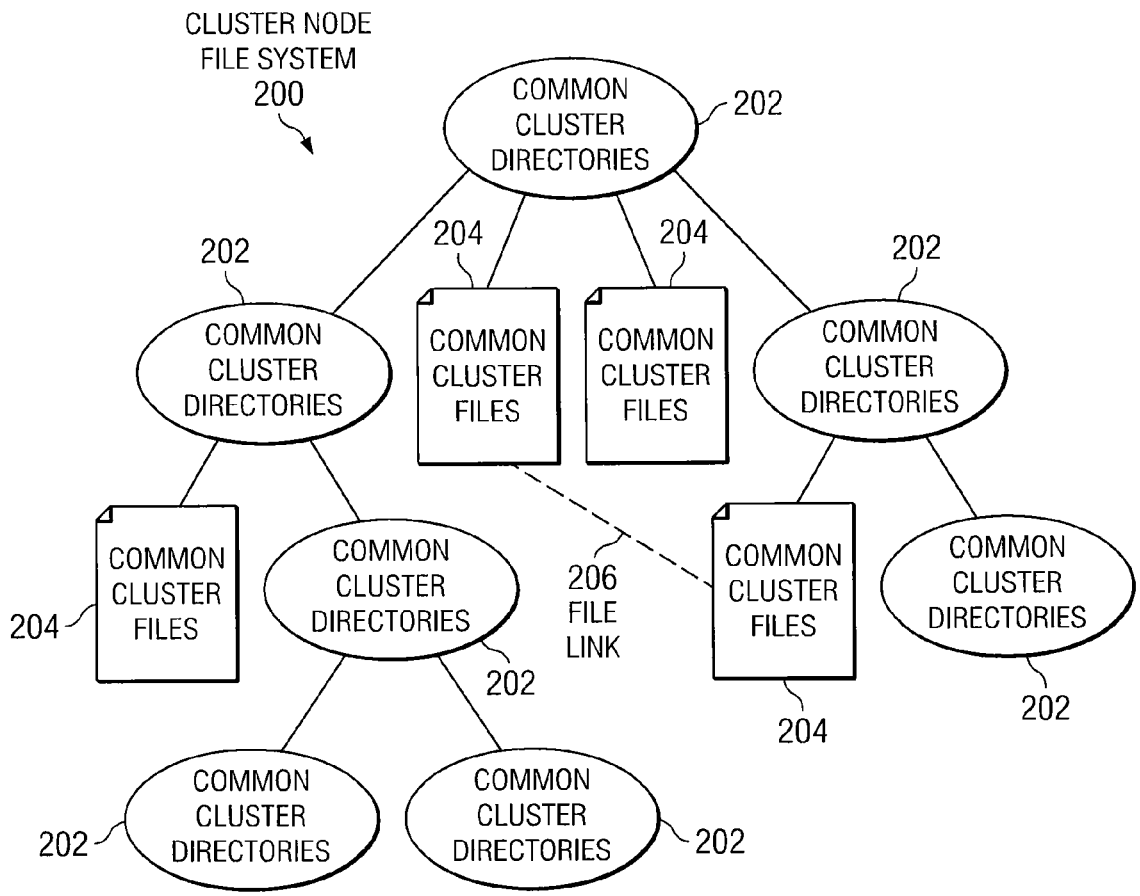
FIG. 3 is a block diagram illustrating an embodiment of a cluster node local file system containing common cluster directories and common cluster files.
Figure 4:
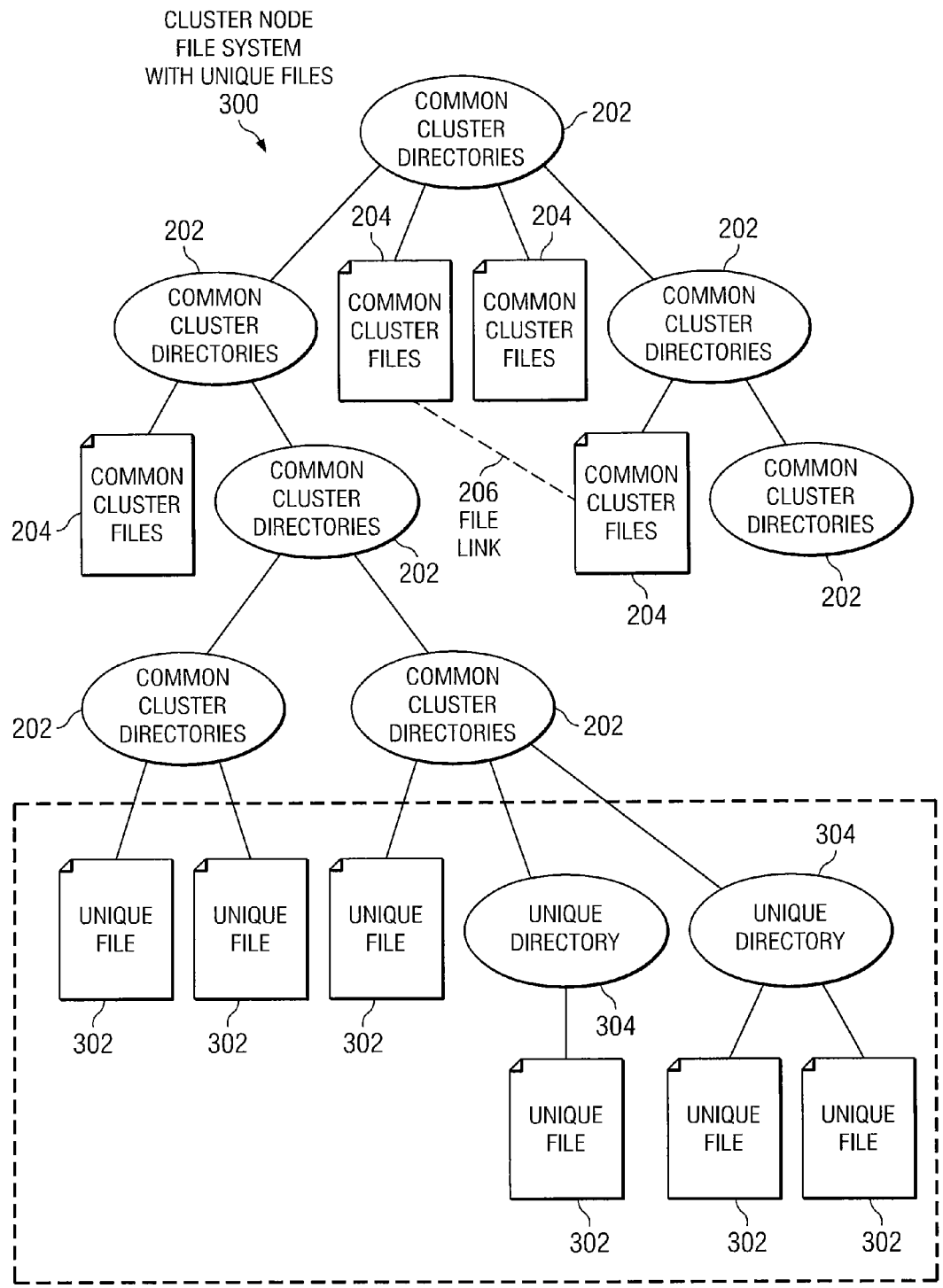
FIG. 4 is a block diagram illustrating an embodiment of a cluster node local file system containing files necessary to the operation of, but unique to, a particular node.
Figure 5:
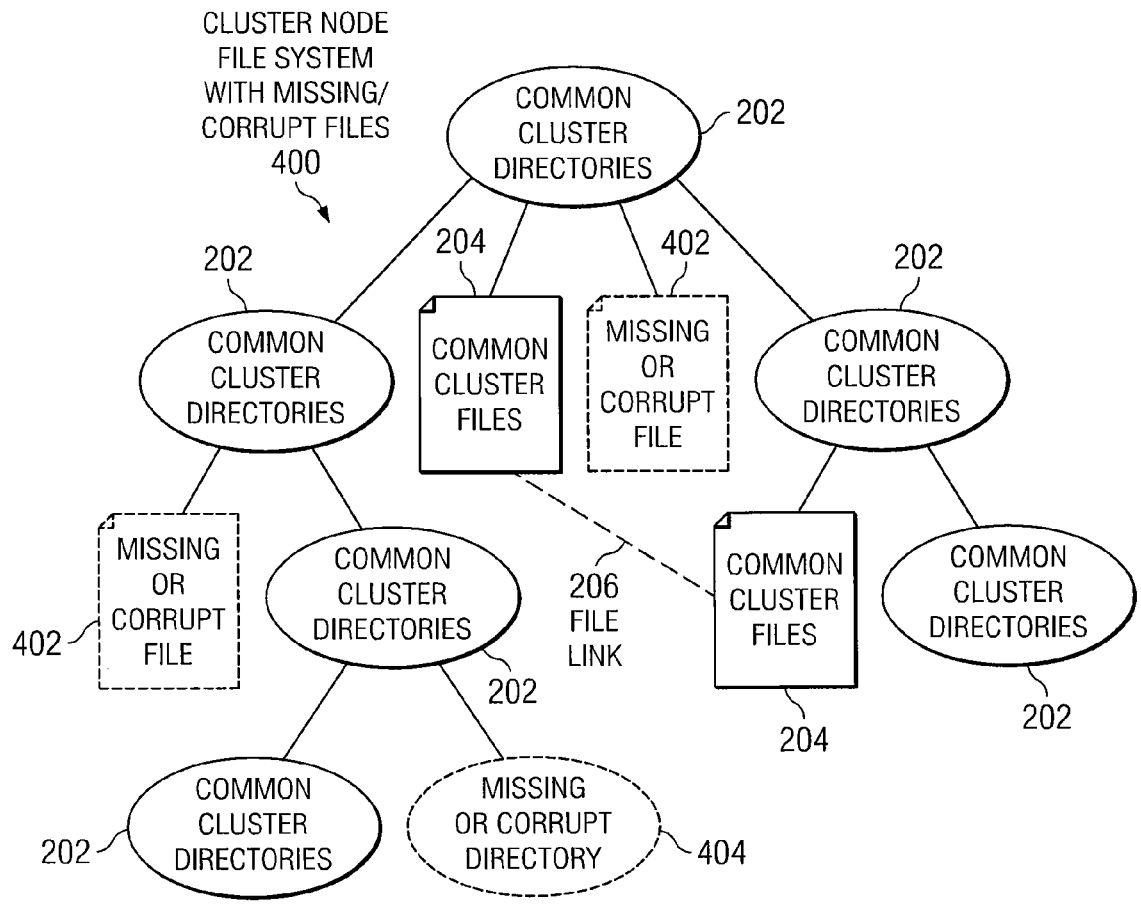
FIG. 5 is a block diagram illustrating an embodiment of a cluster node local file system with missing or corrupt common cluster files and directories.
Figure 6:
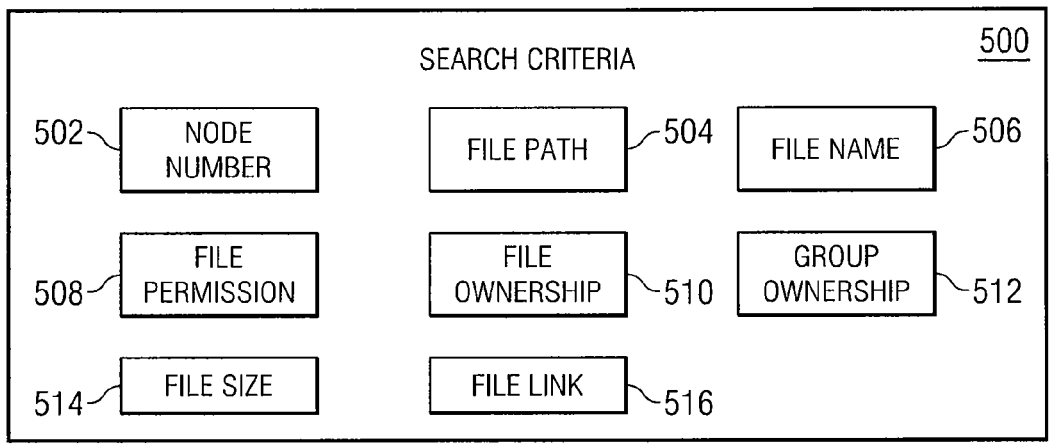
FIG. 6 is block diagram illustrating an embodiment of the available file and directory attributes on a cluster node local file system.
Figure 7:
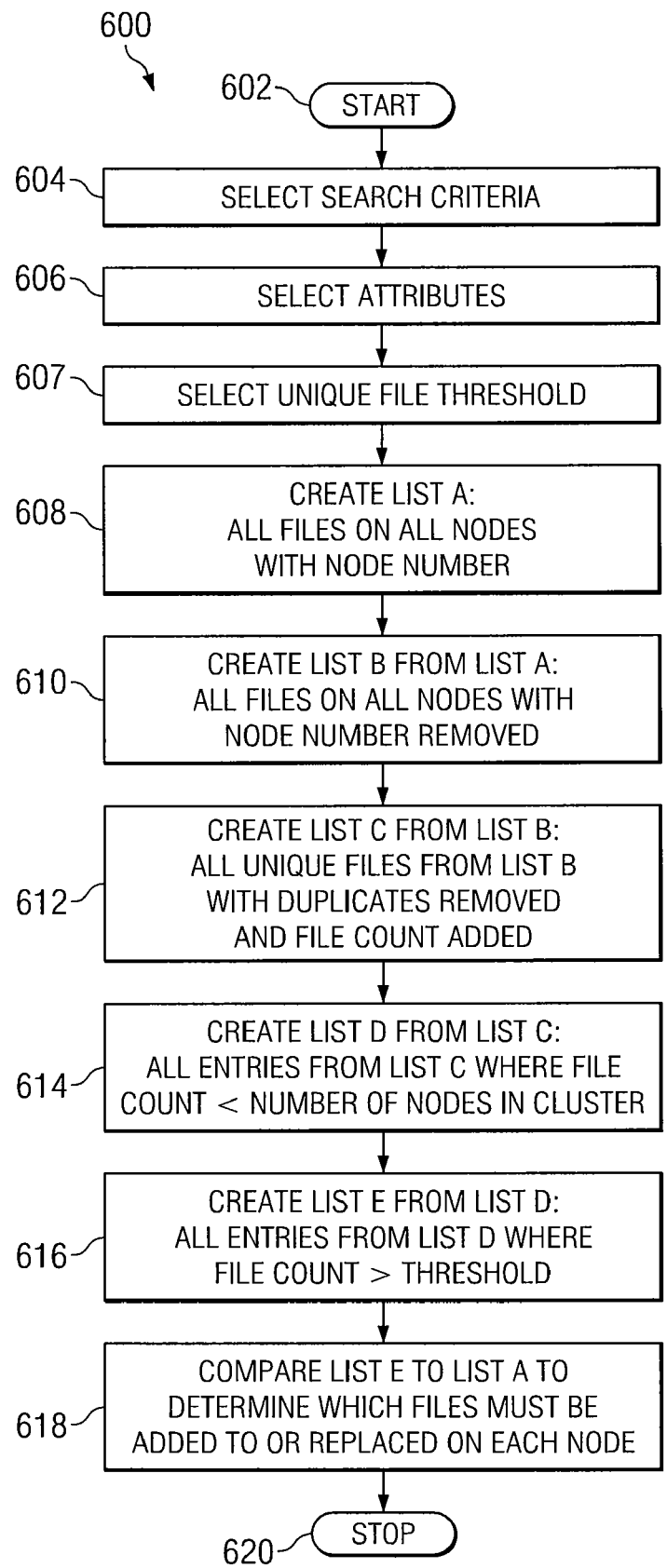
FIG. 7 is a process flowchart illustrating an embodiment of the method and logic of identifying and verifying common cluster files residing on nodes in a cluster.

FIG. 1 illustrates a single node 10 in a supercomputer cluster of nodes 10, that includes the above-described software, within the cluster 100 illustrated in FIG. 2. FIGS. 3 through 5 provide additional detail of properties of node 10 with particular descriptions of files stored on node 10. FIG. 6 illustrates particular attributes used with the above-described software on node 10 and FIG. 7 shows steps performed by that software. Additional details are described below.

FIG. 1 is a block diagram illustrating an embodiment of a supercomputer cluster node 10. In the illustrated embodiment, node 10 includes inputs 16, a central processing unit 14 (CPU), and outputs 18. Through inputs 16 and outputs 18, CPU 14 accesses internal memory 20, local storage 12, and a network or cluster interface 24. Memory 20 comprises fast storage that stores and executes an operating system 28 and application software 22. Local storage 12 maintains a local file system 200 comprising files for the processing functions of node 10. Cluster interface 24 enables node 10 to communicate and coordinate with other nodes 10. Identification and verification application 26 functions to determine missing and corrupt common cluster files and unique files on nodes 10 in the cluster 100.

In certain embodiments, application software 22 includes a set of computer readable instructions, such as identification and verification application 26, configured to identify and verify common cluster files 204 as well as unique files 302 that may be present on a small number of nodes 10. File management on supercomputer cluster nodes 10 is typically accomplished through the use of a central database. Certain embodiments offer advantages over the use of a central database. A central database approach is susceptible to faulty user intervention, faulty installation scripts, spurious file system errors, external rogue software, and typically does not manage unique files present on a small number of nodes 10. A central database approach typically requires substantial system overhead and constant monitoring of cluster nodes 10 that increases network traffic. Certain embodiments of the present invention use a multi-pass method involving the creation of unique keys related to nodes 10, common cluster files 204, and unique files 302 as well as their attributes. Examples of certain advantages of such embodiments include reduced network traffic, flexible scheduling, reduced system overhead through periodic, rather than continuous, monitoring, and identification and verification of unique files 304 as well as common cluster files 204.

In certain embodiments, node 10 may access common cluster files 204 on local storage 12 to carry out desired functions. Nodes 10 may use common cluster files 204 to complete a particular process. Identification and verification application 26 may be used to identify and verify the presence and integrity of common cluster files 204 on nodes 10 in the cluster 100. Certain embodiments of identification and verification application 26 may also determine which files are necessary, but unique, to a given node 10.

In certain embodiments, node 10 may represent any computer system configured to perform vector or parallel processing functions in supercomputer cluster 100. Examples of cluster node 10 include the Sun Blade 6000 system, IBM BladeCenter system, HP Proliant server, Apple XServe G5 server, and any suitable computer system configured to act as a supercomputer node 10. In certain embodiments, node 10 may comprise a rack mount or tower chassis.

Logic performs the operations of the component, for example, executes instructions to generate output from input. Logic may include hardware, software, and/or other logic. Logic may be encoded in one or more tangible media and may perform operations when executed by a computer. Certain logic, such as a processor, may manage the operation of a component. Examples of a processor include one or more computers, one or more microprocessors, one or more applications, and/or other logic. CPU 14 may represent any suitable processor configured to operate in cluster node 10. Examples of CPU 14 include the AMD Barcelona processor, the AMD Opteron processors, the Intel Clovertown processor, the Intel Xeon processors, the IBM Power-based p5, the IMB Cell processor, and any other suitable CPU 14. In certain embodiments, CPU 14 may contain multiple cores, and each node 10 may contain one to eight or more CPUs 14. Typically, processors range in speed from 2.0 Ghz to 3.2 Ghz or faster, and processor cache sizes range from 128 KB to 12 MB or more.

A memory 20 stores information. A memory 20 may comprise one or more tangible, computer-readable, and/or computer-executable storage medium. Examples of memory 20 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium. In certain embodiments, memory 20 may represent volatile, high speed, random access storage used to transfer data and executable machine code directly to and from CPU 14 through inputs 16 and outputs 18. Examples of memory 20 include single in-line memory modules (SIMMs), dual in-line memory modules (DIMMs), double data rate (DDR) memory, DDR2 memory, and any other suitable application of memory technology.

Operating system 28 may be any suitable collection of machine instructions used for the general functioning of node 10 in a coordinated computing environment such as supercomputer cluster 100. Typically, operating systems 28 supply device drivers, which allow the computer system to control internal and external devices such as hard disk drives, monitors, keyboards, mice, printers, and network interfaces. Operating systems 28 generally also provide a framework for executing application software 22. Examples of operating system 28 that may be used by cluster node 10 include Microsoft Windows HPC Server 2008, Red Hat Linux, Fedora Linux, any flavor of Unix, Apple Mac OSX, other proprietary operating systems, or any other suitable operating system 28. In the illustrated embodiment, operating system 28 is some flavor of Unix.

In certain embodiments, application software 22 for supercomputer cluster node 10 may be computer programs that perform one or more specific functions. These functions may be utilitarian, scientific, logistical, or general purpose, or they may serve any other suitable function. Examples of application software 22 for cluster node 10 include bioinformatics applications such as Emboss and Glimmer, computational fluid dynamics applications such as Fluent and Flow-3D, computational chemistry applications such as CHARMM and NWChem, physics and astrophysics applications, weather modeling applications such as MM5 and WRF, and any other suitable application software 22. In the illustrated embodiment, application software 22 is a package that identifies and verifies common cluster files 204 residing on the local storage 12 of cluster nodes 10.

Local storage 12 may be any device or medium that can permanently store data and instructions for later use by node 10. Typically, local storage 12 houses file system 200 that comprises common cluster files 204 and other files unique to node 10. Examples of local storage 12 include hard disk drives, hard disk drive arrays, flash memory, tape drives, and any other suitable storage medium. File system 200 and common cluster files 204 are described in more detail with reference to FIGS. 3, 4, and 5.

An interface 24 receives input, sends output, processes the input and/or output, and/or performs other suitable operation. An interface 24 may comprise hardware and/or software. In certain embodiments, cluster interface 24 may be a device that allows node 10 to communicate with other cluster nodes 10 and coordinate application software 22 execution. In one embodiment, cluster interface 24 is a high speed network adapter or switch. Cluster interfaces may use 10GigE, fiber, InfiniBand Architecture (IBA), or any other suitable technology that may be a combination of hardware and software elements. Examples of cluster interface 24 include the Microsoft Message Passing Interface, the Mellanox ConnecX Dual-Port InfiniBand Host Channel Adapter, the Intel 82598EB 10 Gigabit Ethernet Controller, and any other suitable cluster interface 24. Interface 24 allows node 10 to operate as part of cluster 100, described in greater detail in conjunction with FIG. 2.

FIG. 2 is a block diagram illustrating an embodiment of supercomputer cluster 100. In the illustrated embodiment, cluster 100 includes one or more head nodes 10*a* and one or more slave nodes 10*b*. Each one of nodes 10 is logically coupled to a cluster controller 102. In certain embodiments, cluster controller 102 may be logically coupled to shared storage 108 that is available to nodes 10. In certain embodiments, connection 106 may represent a secure shell (SSH) interface that allows head node 10*a* to administer slave nodes 10*b*.

Cluster 100 is a group of computers working closely together, and may be considered a single computer. Typically, cluster 100 is a grouping of individual nodes 10 that fully trust each other and may or may not be in the same physical location. Cluster 100 may be a high availability (HA) cluster in which redundant nodes 10 provide fail-over capabilities. Examples of cluster 100 include the Sun Constellation supercomputer, the IBM System Cluster 1350, the HP Proliant Cluster, the PSSC Labs PowerWulf Cluster, and any other suitable cluster 100.

In certain embodiments, node 10 may be a head node 10a (or "login node") or a slave node 10b. Head node 10a is typically configured with a monitor and keyboard and supports user 104 interaction. Slave node 10b typically does not support direct user 104 interaction, but may be remotely manageable through a secure protocol such as simple network management protocol (SNMP) or secure shell (SSH).

Cluster controller 102 coordinates the activities of nodes 10 in cluster 100. In certain embodiments, controller 102 may be a dedicated proprietary device. In other embodiments, it may simply be a network switch operating in concert with operating system 28 software on node 10 or a server. Examples of cluster controller 102 include the Sun Magnum controller for the Constellation supercomputer, the Microsoft Windows Compute Cluster Server (CCS), PSSC Labs CBeST, certain open source components, and any suitable combination of hardware and/or software required to control the functioning of cluster 100.

In certain embodiments, common storage 108 is persistent storage that is available to and shared by all nodes 10 in cluster 100. Examples of common storage 108 include hard disk drives, hard disk drive arrays, tape drives, and any other suitable storage medium. Each node 10 in cluster 100 contains local file system 200.

FIG. 3 is a block diagram illustrating a local file system 200 residing on local storage 12 of node 10. File system 200 includes common cluster directories 202 that are mirrored on the nodes 10 in the cluster 100. Each directory 202 may contain other directories 202 and/or common cluster files 204 which are also mirrored on every node 10 in the cluster 100. Each file may have a link 206 to one or more files 204 in file system 200.

In certain embodiments, directories 202 and files 204 bear certain attributes such as the hierarchical path to the file 204 or directory 202, the file 204 or directory 202 name, read/write permission, ownership, group ownership, file size, and any link 206 to another file. Directories 202 may be nested to any number of levels. File 204 and directory 202 attributes are described in more detail with reference to FIG. 6.

FIG. 4 is a block diagram illustrating a local file system 300 residing on local storage 12 of node 10 comprising all the elements of file system 200. In addition to the elements present in local file system 200, local file system 300 contains unique files 302 and/or unique directories 304 present on one or a small percentage of nodes 10 in the cluster 100.

In certain embodiments, unique files 304 on node 10 may be executable code or data configured to carry out specialized functions and processes not shared by other nodes 10 in cluster 100. Unique files 304 may also represent external rogue files that are the result of mistake or malicious intent. Examples of unique files include certain configuration files containing, but not limited to, network information, licensing information, application-specific information, and/or user-created files.

FIG. 5 is a block diagram illustrating a local file system 400 residing on local storage 12 of node 10 comprising all the elements of file system 200. In addition to these elements, file system 400 contains missing or corrupt files 402 and missing or corrupt directories 404.

Missing or corrupt files 402 are files that have been identified as common cluster files 204 that are not present in file system 400, are the wrong size, and/or possess the wrong attributes. Similarly, missing or corrupt directories 404 are directories that have been identified as common cluster directories 202 that are not present in file system 400 and/or possess the wrong attributes.

FIG. 6 is a block diagram illustrating file and directory attributes 500 that may be monitored by certain embodiments of the invention. The node number 502 represents a unique identifier for each node 10 in cluster 100. File path 504 represents the logical location of a file on node 10. File name 506 represents the local name of the data comprising a file on node 10. File permission 508 represents the types of operations that may be performed on a file on node 10. File ownership 510 determines the user and/or users that are responsible for the file on node 10. Group ownership 512 determines the group of users that share responsibility for a file on node 10. File size 514 represents the number of bytes used by a file on node 10. File link 516 represents any logical connection from one file on node 10 to another file on node 10.

In certain embodiments, node number 502 is an integer between 1 and N, where N represents the number of nodes 10 in cluster 100. File path 504 demonstrates a navigational path through a hierarchical file system that identifies the logical location of a file. Examples of hierarchical file systems include NTFS and JFS1. File names 506 generally are unique to the file path 504 they logically reside in and may contain a name and one or more file extensions that may identify the use and purpose of the file. File permissions 508 typically determine whether the file is hidden, read-only, may be overwritten or appended, and/or deleted or renamed. File ownership 510 and group ownership 512 typically determine which users may change the attributes of a file on node 10. File size 514 may represent the size the actual footprint allocated to a file, which may include and internal blocking factor or file system cluster factor, or it may represent the actual number of bytes relevant to the file. File link 516 may represent one or more files logically grouped to satisfy a particular function or process.

FIG. 7 is a flowchart illustrating a process 600 for identifying and verifying common cluster files 204, common cluster directories 202, unique files 302, unique directories 304, missing or corrupt files 402, and/or missing or corrupt directories 404. In one embodiment, steps 602 through 620 are performed by identification and verification application 26.

Process 600 begins at step 602 and uses common storage 108 to store intermediate and/or final results. In step 604, search criteria are selected. Attributes to be used for monitoring are selected in step 606. A unique file threshold is selected in step 607. Step 608 creates a first list A that contains a primary key comprising the node number with the selected attributes concatenated to the node number. Step 610 creates a second list B by removing the node number from each entry in first list A to create the primary key for second list B and sorting the resulting second list B by primary key. Step 612 creates a third list C by removing all duplicates from second list B, and concatenating the primary key of second list B to a file count for each entry from second list B. Step 614 creates a fourth list D by removing all entries from third list C where file count is less than the number of nodes selected in step 604. Step 616 creates fifth list E by removing all entries from fourth list D where file count is less than the unique file threshold selected in step 607. Step 618 determines which files must be added to or replaced on each node. Step 620 terminates process 600.

In certain embodiments, search criteria, selected in step 604, may comprise the range of nodes 10 in cluster 100 to be searched and/or the types of files to be managed. An example of a range of nodes 10 may be 1-100, or 200-300 of 300 nodes 10. Attributes may be one or more file or directory attributes 500. In certain embodiments, first list A may have a primary key comprising {$node_n$: file path: file name: file permissions: file ownership: group ownership: file size: file link} where $node_n$ is the node number for a particular node 10. Certain embodiments may use different combinations of node number and file or directory attributes 500.

In certain embodiments, second list B represents all files and/or directories meeting the search criteria selected in step 604 with selected attributes 500 on all selected nodes 10 sorted in order without regard to uniqueness.

In certain embodiments, third list C represents the number of nodes 10 each file and/or directory appears on that meet the search criteria selected in step 604.

In certain embodiments, fourth list D represents a list of all files and/or directories that do not appear on every node 10 in cluster 100.

In certain embodiments, fifth list E represents a list of all files and/or directories that do not appear on every node 10 in cluster 100 and are not likely to be a unique file 302 and/or directory 304. The entries remaining in fifth list E represent common cluster files 204 and common cluster directories 202. The use of the threshold improves in accuracy as the number of nodes 10 in the cluster 100 increases. Typically, if a file and/or directory appears on more than 40% of nodes 10, it is a common cluster file 204 or a common cluster directory 202. If a file and/or directory appears on fewer than 40% of nodes 10, it is a unique file 302 and/or directory 304. The threshold may range between 20% and 60% of nodes 10 in cluster 100. Fifth list E allows a system administrator to identify which nodes 10 require maintenance by comparing fifth list E with first list A to determine which nodes 10 are missing which common cluster files 204 and directories 202.

In certain embodiments, process 600 may be executed from a head node 10a on head nodes 10a and slave nodes 10b using Secure Shell (SSH). Results may be stored on common cluster storage 108.

It will be apparent that many modifications and variations may be made to embodiments of the present invention, as set forth above, without departing substantially from the principles of the present invention. Therefore, all such modifications and variations are intended to be included herein within the scope of the present invention, as defined in the claims that follow.

What is claimed is:

1. A method for identification and verification of common cluster files and/or directories residing on nodes in a cluster, the method comprising:
   compiling a first list of all files stored on all nodes of the cluster, wherein a file name concatenated to a complete directory path concatenated to a node number for each file constitutes a primary key for the first list;
   compiling a second list of primary keys from the first list by removing the node number from each primary key;
   sorting the second list by primary key;
   compiling a third list of unique primary keys from the second list together with a primary key count representing the number of items in the first list for each unique primary key;
   sorting the third list by primary key count;
   compiling a fourth list of unique primary keys from the third list of unique primary keys by discarding any entry from the third list in which the primary key count is equal to the number of nodes in the cluster;
   compiling a fifth list of unique primary keys from the fourth list of unique primary keys by discarding any entry from the fourth list in which the primary key count is less than or equal to a predetermined threshold indicative of the population of unique files; and
   storing the fifth list on a computer readable medium.

2. The method of claim 1, the method further comprising comparing the fifth list to the first list to determine the common cluster files and/or directories that must be added to and/or replaced on each node.

3. The method of claim 1, the method further comprising selecting a subset of nodes in the cluster for processing.

4. The method of claim 1, the method further comprising selecting a subset of files and/or directories in the cluster for processing.

5. The method of claim 1 wherein the files each comprise attributes including:
   file permissions;
   file ownership;
   group ownership;
   file size;
   file link;
and further comprising selecting and concatenating each attribute to the primary key of the first list.

6. The method of claim 1 wherein the predetermined threshold is selected by a user.

7. The method of claim 1 wherein the computer readable medium comprises common cluster storage.

8. A method for managing common cluster files residing on nodes in a cluster, the method comprising:
   compiling a first list of all files stored on all nodes of the cluster;
   compiling a second list indicative of unique files and the number of nodes on which each unique file is stored from the first list;
   determining, from the second list, unique files which are not stored on all nodes;
   determining, from the second list, which files are required by all nodes; and
   determining, from the first list and the second list, which files must be added to and/or replaced on each node.

9. The method of claim 8, the method further comprising selecting a subset of nodes in the cluster for processing.

10. The method of claim 8, the method further comprising selecting a subset of files and/or directories in the cluster for processing.

11. The method of claim 8 wherein the files each comprise attributes including:
    file permissions;
    file ownership;
    group ownership;
    file size;
    file link;
and further comprising selecting and concatenating each attribute to the primary key of the first list.

12. The method of claim 8 wherein a predetermined threshold may be selected for determining unique files.

13. The method of claim 8 wherein the first list and the second list are stored on a computer readable medium.

14. The method of claim 13 wherein the computer readable medium comprises common cluster storage.

15. Logic for managing common cluster files residing on nodes in a cluster, the logic embodied in a computer-readable medium and operable to:

compile a first list of all files stored on all nodes of the cluster;

compile a second list indicative of unique files and the number of nodes on which each unique file is stored from the first list;

determine, from the second list, unique files which are not stored on all nodes;

determine, from the second list, which files are required by all nodes; and determine, from the first list and the second list, which files must be added to and/or replaced on each node.

16. The logic of claim 15, the logic further operable to select a subset of nodes in the cluster for processing.

17. The logic of claim 15, the logic further operable to select a subset of files and/or directories in the cluster for processing.

18. The logic of claim 15 wherein the files each comprise attributes including:

file permissions;
file ownership;
group ownership;
file size;
file link;

and wherein the logic is further operable to select and concatenate each attribute to the primary key of the first list.

19. The logic of claim 15 wherein the logic is further operable to select a predetermined threshold for determining unique files.

20. The logic of claim 15 wherein the first list and the second list are stored on common cluster storage.

* * * * *